United States Patent
Wang et al.

(10) Patent No.: US 11,858,627 B2
(45) Date of Patent: Jan. 2, 2024

(54) METHOD OF HIGH ENERGY EFFICIENCY UNMANNED AERIAL VEHICLE (UAV) GREEN DATA ACQUISITION SYSTEM

(71) Applicant: DALIAN UNIVERSITY OF TECHNOLOGY, Liaoning (CN)

(72) Inventors: Tianhao Wang, Liaoning (CN); Nan Zhao, Liaoning (CN); Xiaowei Pang, Liaoning (CN); Deyue Zou, Liaoning (CN); Bingcai Chen, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 97 days.

(21) Appl. No.: 17/619,487

(22) PCT Filed: Jun. 10, 2021

(86) PCT No.: PCT/CN2021/099267
§ 371 (c)(1),
(2) Date: Dec. 15, 2021

(87) PCT Pub. No.: WO2022/160554
PCT Pub. Date: Aug. 4, 2022

(65) Prior Publication Data
US 2022/0371730 A1    Nov. 24, 2022

(30) Foreign Application Priority Data
Jan. 29, 2021 (CN) .......................... 202110134201.0

(51) Int. Cl.
*B64C 39/02* (2023.01)
*G05B 17/02* (2006.01)

(52) U.S. Cl.
CPC ............ *B64C 39/024* (2013.01); *G05B 17/02* (2013.01); *B64U 2201/10* (2023.01)

(58) Field of Classification Search
CPC ............................. B64C 39/024; G05B 17/02
(Continued)

(56) References Cited

U.S. PATENT DOCUMENTS

| | | | |
|---|---|---|---|
| 8,447,441 B2 * | 5/2013 | Calvignac | G06F 7/00 700/286 |
| 2018/0074523 A1 * | 3/2018 | Cantrell | B60L 53/55 |
| 2018/0150072 A1 * | 5/2018 | Boss | B64C 39/024 |

FOREIGN PATENT DOCUMENTS

| | | |
|---|---|---|
| CN | 110225465 A | 9/2019 |
| CN | 110364031 A | 10/2019 |

(Continued)

*Primary Examiner* — Peter D Nolan
*Assistant Examiner* — Luke Huynh
(74) *Attorney, Agent, or Firm* — Muncy, Geissler, Olds & Lowe, P.C.

(57) ABSTRACT

A design method of a high energy efficiency unmanned aerial vehicle (UAV) green data acquisition system belongs to the technical field of data acquisition and optimization for UAV uplink communication. Firstly, a system optimization objective is constructed; and in a uplink communication network of a single UAV and ground sensors, the UAV receives data periodically. Secondly, according to a constructed optimization problem, the optimization objective is maximization of $EE(\{W\},\{t\},\{S\})$. Finally, an original problem is decomposed into two approximate concave-convex fractional sub-problem based on a block coordinate descent method and a successive convex approximation technique to obtain a suboptimal solution; an overall iterative algorithm is proposed: in each iteration, by solving the sub-problems, wake-up scheduling S, time slot t and UAV trajectory W are alternately optimized. The solution obtained in each iteration is used as the input of next iteration. The present invention can jointly optimize the UAV flight trajectory, the sensor wake-up scheduling and the flight time slot to ensure that the transmission information (Continued)

amount and energy consumption of the sensors satisfy system requirements, while maximizing the energy efficiency of the system.

1 Claim, 4 Drawing Sheets

(58) Field of Classification Search
USPC .............................................................. 701/3
See application file for complete search history.

(56) References Cited

FOREIGN PATENT DOCUMENTS

| | | |
|---|---|---|
| CN | 110730495 A | 1/2020 |
| CN | 112911534 A | 6/2021 |

* cited by examiner

METHOD OF HIGH ENERGY EFFICIENCY UNMANNED AERIAL VEHICLE (UAV) GREEN DATA ACQUISITION SYSTEM

TECHNICAL FIELD

The present invention belongs to the technical field of data acquisition and optimization for UAV uplink communication, relates to a design solution for high efficiency green communication of a single unmanned aerial vehicle (UAV) and ground sensors, and particularly relates to a method for jointly optimizing the flight trajectory, sensor wake-up scheduling and time slot by UAV during data acquisition to achieve the purpose of maximizing the energy efficiency of the system.

BACKGROUND

UAV is an emerging technology that has been widely used in military, public and civil fields due to its high maneuverability and low cost. With the development of Internet and Internet of Things technology in the future, the UAV can assist in satisfying communication needs of mass connection and high information rate. Application scenarios of UAV assisted information transmission and data acquisition have been extensively studied. Traditionally, the information of the wireless sensor network is transmitted to the data center through multi-hop. Each sensor node not only sends own data, but also forwards data from other nodes, resulting in that the energy of some sensor nodes may be quickly exhausted. Network connection is intermittent and is difficult to guarantee the fairness of users. The UAV is used as an auxiliary mobile node, and each sensor can directly send information to the UAV, thereby ensuring the fairness of the users. In addition, the general Line of Sight (LOS) channel conditions between the UAV and sensors make the information transmission rates faster, and high maneuverability of the UAV is also more suitable for wireless communication in complex environments.

Although the UAV communication system is widely used, the limited on-board energy of the UAV fundamentally limits the endurance and communication time of the UAV. Therefore, it is important to maximize energy efficiency in UAV green communication. The energy efficiency is defined as the transmission bit of information per unit of energy consumption, which can directly increase the amount of information that the UAV can communicate before recall, giving consideration to communication service quality and UAV energy consumption. The present invention appropriately designs the parameters in the system for the purpose of maximizing energy efficiency.

SUMMARY

The purpose of the present invention is to solve the problem of high energy efficiency green communication in UAV data acquisition systems. In a network of uplink communication of a single UAV and I ground sensors, the UAV receives data periodically. The specific solution is shown in schematic diagram 1. The UAV flight trajectory W, the sensor wake-up scheduling S and the time slot t are jointly optimized to ensure that the transmission information amount and energy consumption of the sensor satisfy system requirements, while maximizing the energy efficiency EE of the system.

To achieve the above purpose, the present invention adopts the following technical solution:

A design method of a high energy efficiency UAV green data acquisition system comprises the following steps:

Step 1, constructing a system optimization objective:

(1) Serving a set of I ground sensors which are randomly distributed through time division multiple access (TDMA) by a UAV. The UAV and the sensors are respectively provided with a single antenna, and the sensors do not interfere with each other during serving.

(2) Flying, by the UAV, at a fixed altitude H with a maximum flight speed of $V_m$ and a total cycle of T, and discretizing the cycle T into N time slots by a time discretization method, with the length of each time slot of $$t = \frac{T}{N}.$$

The coordinate of the UAV is $w[n]=[x(n),y(n)]^T \in R^{2\times 1}$ in time slot n, wherein x(n), y(n) are the x-coordinate and y-coordinate of the UAV respectively, and $R^{2\times 1}$ is a two-dimensional vector space. For a sensor set SI={1, 2, ..., I} of random distribution, the coordinate of sensor i is fixed as $L_i=[x_i,y_i]^T \in R^{2\times 1}, i \in SI$, each sensor supports the energy of $E_i$, $i\in SI$ and the data amount to be transmitted is $B_i, i\in SI$. If communication between the UAV and ground is line of sight (LoS) link communication, channel quality only depends on a distance between the UAV and the sensor, and power gain in unit reference distance is expressed as $\rho_0$. Then the channel power gain $h^i[n]$ of the sensor i in the time slot n conforms to a free space path loss model, i.e., $$h^i[n] = \rho_0 d^i[n]^{-2} = \frac{\rho_0}{H^2 + \|w[n] - L_i\|^2}, \forall i \in SI, d^i[n]$$

is the distance between the UAV and the sensor i in the three-dimensional space.

(3) Assuming that the UAV serves only one sensor in one time slot, and defining a binary variable $S_i[n]\in \{0,1\}$ to represent wake-up scheduling of the sensor. $S_i[n]=1$ indicates that the UAV establishes communication with the sensor i in the time slot n. $S_i[n]=0$ indicates that the UAV does not establish communication with the sensor i in the time slot n. Then, the information transmission rate $R_u^i[n]$ between the UAV and the sensor i in the time slot n can be expressed as:

$$R_u^i[n] = S_i[n]\log_2\left(1 + \frac{P_A \rho_0}{(H^2 + \|w[n] - L_i\|^2)\sigma^2}\right), \forall i \in SI \quad (1)$$

wherein $\sigma^2$ is additive white gaussian noise (AWGN) at a receiving end of the UAV, and $P_A$ is the transmission power of a ground sensor during communication. The unit of $R_u^i[n]$ is bps/Hz. The total information amount $\bar{R}$ (bits/Hz) transmitted in one cycle (N time slots) of serving of the UAV can be expressed as:

$$\bar{R}(\{W\}, \{t\}, \{S\}) = \sum_{n=1}^{N}\sum_{i=1}^{I} R_u^i[n]t \quad (2)$$

For a rotary-wing UAV, when parameters are constant, the propulsion power P(V) of the UAV is mainly related to flight speed V, which can be expressed as:

$$P(V) = \underbrace{P_0\left(1 + \frac{3V^2}{\Omega^2 r^2}\right)}_{blade\ profile\ power} + \underbrace{\frac{1}{2}d_0\rho s A V^3}_{parasite\ power} + \underbrace{P_i\left(\sqrt{1 + \frac{V^4}{4v_0^4}} - \frac{V^2}{2v_0^2}\right)^{1/2}}_{induced\ power} \quad (3)$$

The propulsion power is composed of three parts: blade profile power, parasite power and induced power. Due to time discretization, the speed of the time slot n can be approximately expressed as $$v[n] = \frac{\|w[n+1] - w[n]\|}{t} \triangleq \frac{\Delta_n}{t},$$

and $\Delta_n$ is defined as the flight distance of the time slot n. Then the propulsion power $P_{prop}[n]$ of the time slot n can be approximated expressed by the following formula:

$$P_{prop}[n] = P_0\left(1 + \frac{3\Delta_n^2}{\Omega^2 r^2 t^2}\right) + \frac{1}{2}d_0\rho s A \frac{\Delta_n^3}{t^3} + P_i\left(\sqrt{1 + \frac{\Delta_n^4}{4v_0^4 t^4}} - \frac{\Delta_n^2}{2v_0^2 t^2}\right)^{1/2} \quad (4)$$

In the formula, $P_0$ and $P_i$ are the blade profile power and the induced power respectively in a hovering state; $\Omega$ is blade angular velocity; r is rotor radius; $d_0$ represents fuselage drag ratio; $\rho$ is air density; s is rotor solidity; A is rotor disc area; $v_0$ is mean rotor induced velocity; the above parameters are constants. The total propulsion energy E consumed by the UAV in one cycle of serving can be expressed as:

$$E(\{W\}, \{t\}) = \sum_{n=1}^{N} P_{prop}[n]t \quad (5)$$

According to the definition of energy efficiency, the system optimization objective can be represented as:

$$EE(\{W\}, \{t\}, \{S\}) = \frac{\overline{R}(\{W\}, \{t\}, \{S\})}{E(\{W\}, \{t\})} = \frac{\sum_{n=1}^{N}\sum_{i=1}^{I} R_u^i[n]t}{\sum_{n=1}^{N} P_{prop}[n]t} \quad (6)$$

Step 2, constructing an optimization problem according to the energy efficiency formula in step 1, wherein an optimization objective is maximization of EE({W},{t},{S}), and constraints comprise UAV trajectory constraints, sensor wake-up scheduling constraints, sensor energy constraint and data amount constraint to construct the following optimization problem:

$$\max_{S,W,t} EE(\{W\}, \{t\}, \{S\}) \quad (7a)$$

$$s.t.\ w[1] = w[N] \quad (7b)$$

-continued $$\|w[n+1] - w[n]\|^2 \leq \gamma H^2, n = 1, \ldots N-1 \quad (7c)$$

$$\|w[n+1] - w[n]\| \leq V_m t, n = 1, \ldots N-1 \quad (7d)$$

$$\sum_{i=1}^{I} S_i[n] = 1 \quad (7e)$$

$$S_i[n] \in \{0, 1\}, \forall i \in SI, \forall n \quad (7f)$$

$$\sum_{n=1}^{N} (R_u^i[n]t) \geq B_i, \forall i \in SI \quad (7g)$$

$$\sum_{n=1}^{N} (S_i[n]P_A t) \leq E_i, \forall i \in SI \quad (7h)$$

In the optimization problem, formulas (7b)-7(d) are trajectory constraints, $V_m$ is the maximum speed of the UAV and the UAV returns to an initial position after flying by a cycle. Formulas (7e) and (7f) are the sensor wake-up scheduling constraints. Formula (7g) is the data amount constraint of the sensor and $B_i$ is the data amount to be transmitted by the sensor i. Formula (7h) is the sensor energy constraint and $E_i$ is maximum energy supported by the sensor i in each cycle.

The above optimization problem is a non-convex optimization problem. An original problem (7) is decomposed into two approximate concave-convex fractional sub-problems based on a block coordinate descent method and a successive convex approximation technique, and Dinkelbach algorithm is used to obtain a suboptimal solution.

Step 3, decomposing an original problem into two sub-problems according to a block coordinate descent method. For the two sub-problems, approximately converting two non-convex problems into two convex optimization problems by a successive convex approximation technique and designing algorithm solving, as follows:

(1) Optimization Sub-Problem of Wake-Up Scheduling S and Time Slot t fixing UAV trajectory W so that the sub-problem is the non-convex optimization problem of wake-up scheduling S and time slot t; firstly, for a binary variable S, slacking S to a continuous variable within a range [0,1]; then, introducing an auxiliary variable z[n] to satisfy $$z[n]^2 = \sqrt{t^4 + \frac{\Delta_n^4}{4v_0^4}} - \frac{\Delta_n^2}{2v_0^2}, \forall n,\ i.e.,\ t^4 = z[n]^4 + \frac{\Delta_n^2}{v_0^2}z[n]^2, \forall n;$$

using z[n] to replace the third term of the propulsion power $P_{prop}[n]$ in formula (4) to obtain the UAV propulsion power $P_{prop}^{A}[n]$ under the sub-problem; introducing an auxiliary variable R_t[i] to satisfy $$R\_t[i]^2 = \sum_{n=1}^{N} R_u^i[n]t, \forall i;$$

after introducing the auxiliary variables, applying the successive convex approximation technique for non-convex constraints, converting hyperbolic constraints into second-order cone programming (SOCP) and approximating the original non-convex sub-problem as a convex problem, which can be expressed as:

$$\max_{\substack{S,W,t \\ z[n], \\ R\_t[i]}} \frac{\sum_{i=1}^{I} R\_t_{lb}[i]}{\sum_{n=1}^{N} P_{prop}^{A}[n]t} \quad (8a)$$

s.t. $\|w[n+1] - w[n]\| \le V_m t, n = 1, \ldots N-1$ (8b)

$$\sum_{i=1}^{I} S_i[n] \le 1, \forall n \quad (8c)$$

$0 \le S_i[n] \le 1, \forall i, \forall n$ (8d)

$R\_t_{lb}[i] \ge B_i, \forall i$ (8e)

$$\sum_{n=1}^{N} (S_i[n] P_A) \le E_i\left(\frac{1}{t}\right)_{lb}, \forall i \quad (8f)$$

$$t^4 \le z^{(r)}[n]^4 + 4z^{(r)}[n]^3 (z[n] - z^{(r)}[n]) + \\ \frac{\Delta_n^2}{v_0^2}(z^{(r)}[n]^2 + 2z^{(r)}[n](z[n] - z^{(r)}[n])), \forall n \quad (8g)$$

$$\left\| \left[2R\_t[i], \sum_{n=1}^{N} R_u^i[n] - t\right]^\dagger \right\| \le \sum_{n=1}^{N} R_u^i[n] + t, \forall i \quad (8h)$$

In the sub-problem (8), $P_{prop}^{A}[n]$ is the propulsion power after the auxiliary variable $z[n]$ is introduced, and is a convex function of $t$ and $z[n]$; $R\_t_{lb}[i]$ is the lower bound of first-order taylor expansion of the auxiliary variable $R\_t[i]^2$, and is a linear function of $R\_t[i]$; $(1/t)_{lb}$ is the lower bound of first-order taylor expansion of $1/t$, and has a linear relationship with $t$. The constraints of the sub-problem (8) are convex constraints; the optimization objective (8a) is a standard concave-convex fractional programming problem with concave numerator over convex denominator; and the existing Dinkelbach algorithm and convex optimization tool CVX can be used for calculation. It should be noted that because the constraint range is reduced by the successive convex approximation technique, the optimal solution of the convex problem after approximation is the lower bound of the optimal solution of an original sub-problem.

(2) Optimization Sub-Problem of UAV Trajectory W fixing wake-up scheduling S and time slot t so that the sub-problem is a non-convex optimization problem of the UAV trajectory W; introducing an auxiliary variable $y[n]$ to satisfy $$y[n]^2 = \sqrt{t^4 + \frac{\Delta_n^4}{4v_0^4}} - \frac{\Delta_n^2}{2v_0^2}, \forall n, \text{ i.e., } \frac{t^4}{y[n]^2} = y[n]^2 + \frac{\Delta_n^2}{v_0^2}, \forall n;$$

using $y[n]$ to replace the third term of the propulsion power $P_{prop}[n]$ in formula (4) to obtain the UAV propulsion power $P_{prop}^{B}[n]$ under the sub-problem; after introducing the auxiliary variables, applying the successive convex approximation technique for non-convex constraints, and approximating the original non-convex sub-problem as a convex problem, which can be expressed as:

$$\max_{W,y[n]} \frac{\sum_{n=1}^{N}\sum_{i=1}^{I} R_u^{i,lb}[n]t}{\sum_{n=1}^{N} P_{prop}^{B}[n]t} \quad (9a)$$

-continued s.t. $w[1] = w[N]$ (9b)

$\|w[n+1] - w[n]\|^2 \le \gamma H^2, n = 1, \ldots N-1$ (9c)

$\|w[n+1] - w[n]\| \le V_m t, n = 1, \ldots N-1$ (9d)

$$\sum_{n=1}^{N} (R_u^{i,lb}[n]t) \ge B_i, \forall i \quad (9e)$$

$$\frac{t^4}{y[n]^2} \le (y^{(r)}[n]^2) + 2y^{(r)}[n](y[n] - y^{(r)}[n]) - \frac{\|w^{(r)}[n+1] - w^{(r)}[n]\|^2}{v_0^2} + \quad (9f)$$

$$\frac{2}{v_0^2}(w^{(r)}[n+1] - w^{(r)}[n]) \cdot (w[n+1] - w[n]) \quad (9g)$$

In the sub-problem (9), $P_{prop}^{B}[n]$ is the propulsion power after the auxiliary variable $y[n]$ is introduced, and is a convex function of $w[n]$; $R_u^{i,lb}[n]$ is the lower bound of first-order taylor expansion of the information transmission rate $R_u^i[n]$ on $\|w[n] - L_i\|$, and is a concave function of $w[n]$. The solving method of the sub-problem (9) is the same as that of the sub-problem (8); and the Dinkelbach algorithm and convex optimization tool CVX can be used for solving. The optimal solution of the convex problem after approximation is the lower bound of the optimal solution of the original sub-problem.

(4) Overall Iterative Algorithm Design

Based on the above results, the present invention proposes an overall iterative algorithm. In each iteration, by solving the sub-problem (8) and the sub-problem (9), alternately optimizing wake-up scheduling S, the time slot t and the UAV trajectory W. The solution obtained in each iteration is used as the input of next iteration. The termination condition for iteration is that the increase of optimization values of one iteration and the previous iteration is less than a set threshold. A specific algorithm process is as follows:

4.1) Setting an iteration termination threshold $\varepsilon$, an initial trajectory $w^0$ and an iteration index $r=0$.

4.2) In the r+1 iteration, using the trajectory $w^r$ obtained from the r iteration to solve the sub-problem (8) to obtain the optimization result of the sub-problem (8) of the r+1 iteration, namely, wake-up scheduling $S^{r+1}$ and time slot $t^{r+1}$.

4.3) Solving the sub-problem (9) by the given $w^r$, $S^{r+1}$ and $t^{r+1}$, to obtain the optimization result of the sub-problem (9) of the r+1 iteration, namely trajectory $w^{r+1}$.

4.4) If the increase of an optimization target value is greater than a threshold $\varepsilon$, then updating the iteration index $r=r+1$; skipping back to step 4.2) for the next iteration; and if the increase of the target value is less than the threshold $\varepsilon$, terminating the iteration.

The present invention has the beneficial effects that: the UAV flight trajectory, the sensor wake-up scheduling and the time slot are jointly optimized to illustrate how to realize the energy saving communication of UAV data acquisition with energy efficiency as an index, so as to provide a reference value method for maximization of the energy efficiency.

DETAILED DESCRIPTION

The present invention is described below in detail in combination with the drawings and embodiments.

Embodiment 1

It is assumed that a UAV serves 6 ground sensors which are randomly distributed. The UAV flies at a fixed altitude H=100 m with a maximum flight speed $V_m$=50 m/s. One cycle T is fixedly divided into N=60 time slots. The coordinates of the sensors are expressed with a matrix as L=[−1100,500;−425,400;600,1100;200,200;800,−400;−700,−600]$^T$. Additive white gaussian noise (AWGN) at the receiving end of the UAV is $\sigma^2$=−110 dBm, and power gain of reference distance is $\rho_0$=−60 dB. The transmission power of the ground sensors is $P_A$=0.1 W. If the UAV flies above the sensors, the channel power gain is $$h^i[n] = \frac{\rho_0}{H^2}, \forall i \in SI.$$

In the case, the information transmission rate $R_u^i[n]$ in formula (1) is the maximum, and the maximum is $R_u^i[n]$=9.9672 bps/Hz.

For the parameters in formula (3), the parameter values of the classic rotary-wing UAV is taken in embodiment 1: blade angular velocity $\Omega$=300 r/s; rotor radius r=0.4 m; fuselage drag ratio $d_0$=0.6; air density $\rho$=1.225 kg/m³; rotor solidity s=0.05; rotor disc area A=0.503 m²; mean rotor induced velocity $v_0$=4.03 m/s. Then, in formula (3), the velocity that minimizes the propulsion power P(V) is $V_{min}$=10.0125 m/s.

Figure 1:
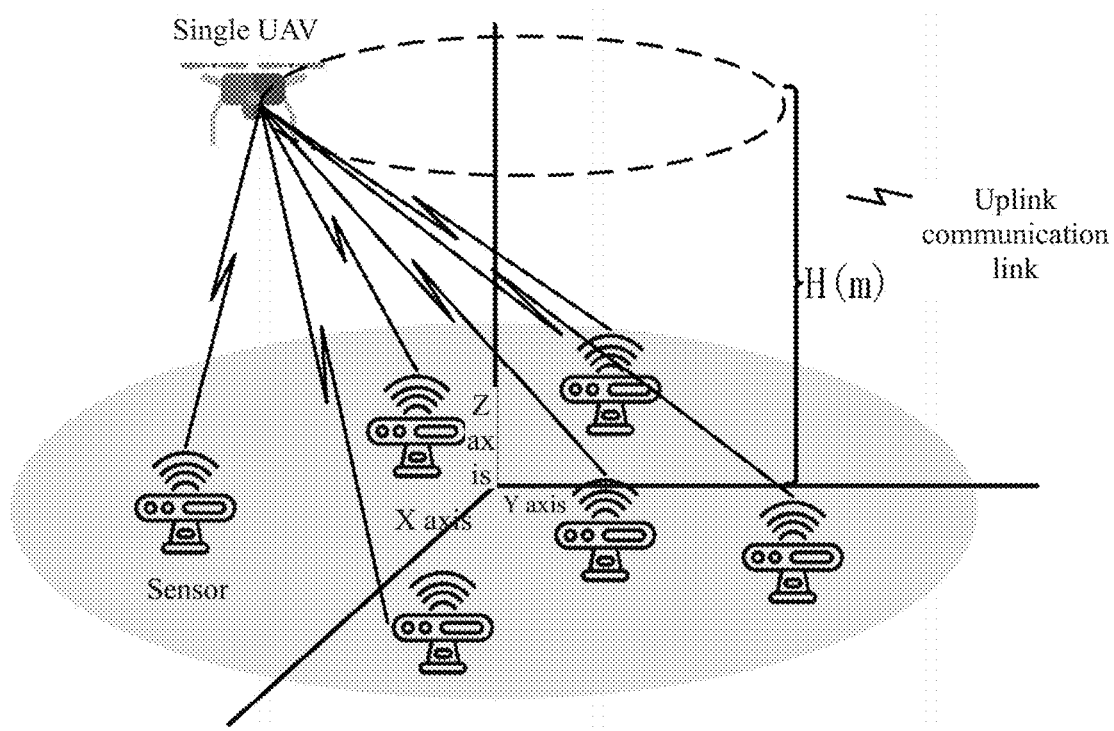
FIG. 1 is a schematic diagram of a single UAV uplink communication of data acquisition.
Figure 2:
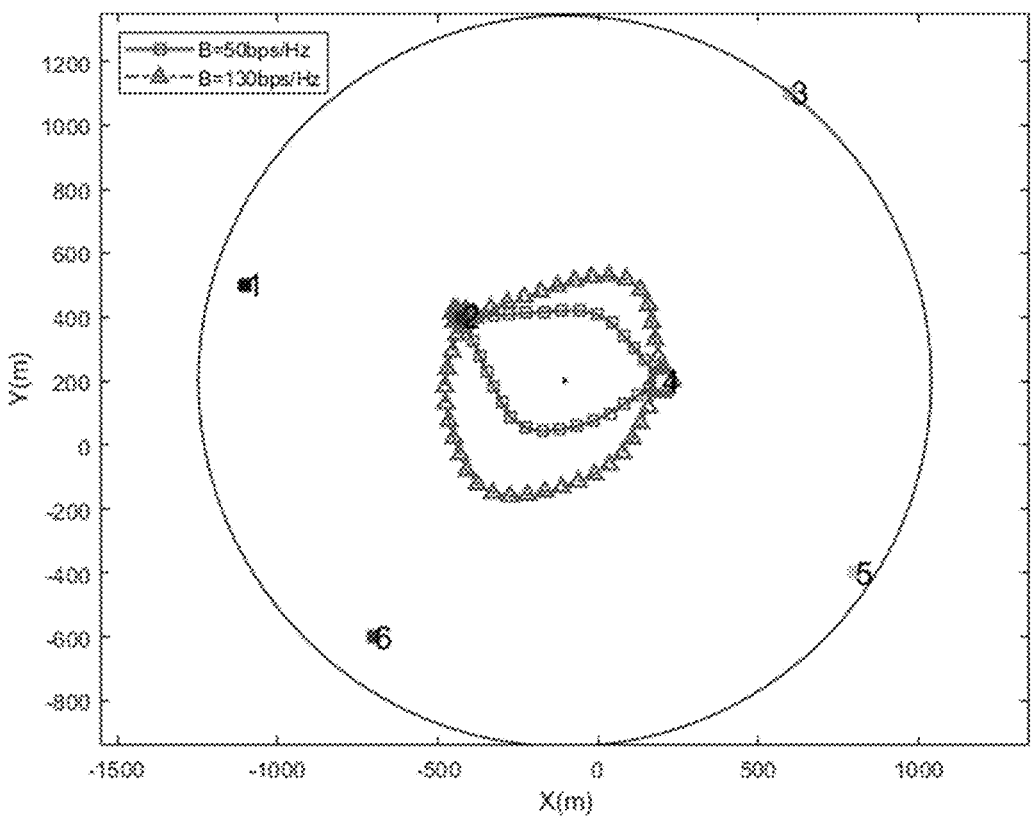
FIG. 2 is a flight trajectory diagram when the transmitted data amounts B are 50 bps/Hz and 130 bps/Hz respectively.
Figure 3:
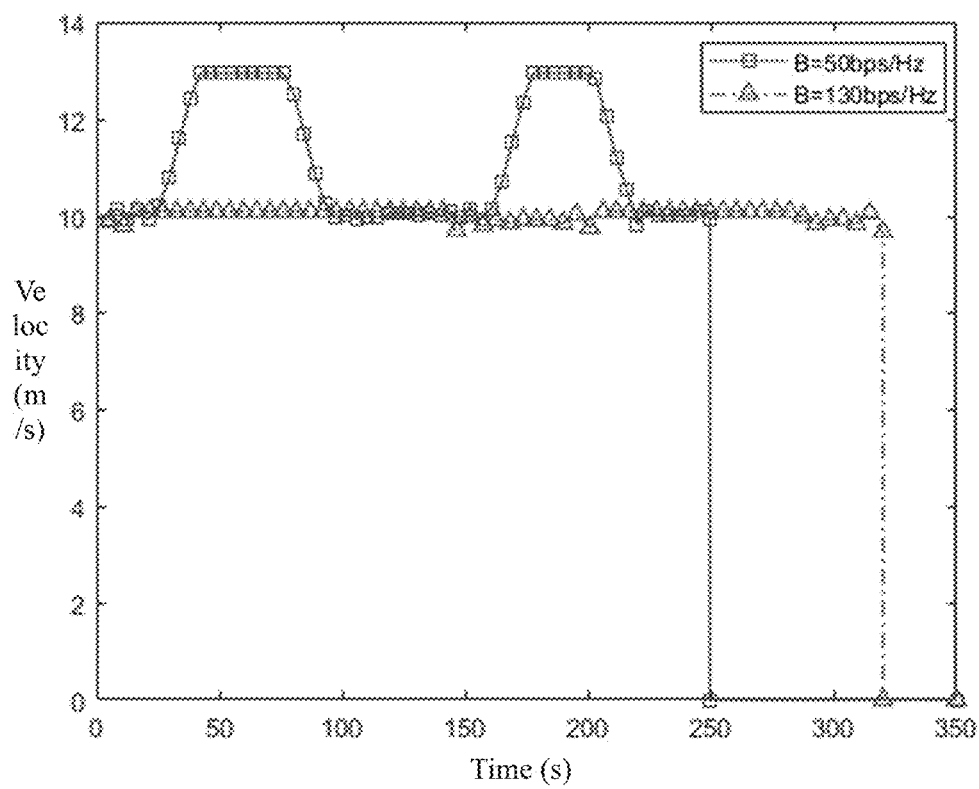
FIG. 3 is a flight speed diagram when the transmitted data amounts B are 50 bps/Hz and 130 bps/Hz respectively.

In this scenario, the present invention assumes that each sensor needs to transmit the same amount of data and has the same energy constraints. Namely, $B_i$=B and $E_i$=E. The above parameters are substituted into the optimization problem (7) for solving, to obtain the trajectory design for maximizing energy efficiency proposed in the present invention, as shown in FIG. 2, and the corresponding flight speed is shown in FIG. 3. The UAV flight trajectory is relatively smooth, and the flight speed changes little and fluctuates around the minimum energy speed $V_{min}$. When B=50 bps/Hz, the UAV only flies within a small range. When B becomes larger than 130 bps/Hz, the flight distance and flight time of the UAV become larger. The UAV hovers near user 2 and User 4 for a period of time. The purpose is to maintain good channel quality and transmit more information while flying at minimum energy speed, so that the UAV can hover near the users.

Embodiment 2

According to the design scenario of embodiment 1, in order to demonstrate the superiority of the present invention, this section proposes two other benchmark solutions and compares the performance. Solution 1: energy efficiency maximization solution (the present invention). Solution 2: flying—hovering solution. Solution 3: energy efficiency maximization solution under fixed circular trajectories.

Figure 4:
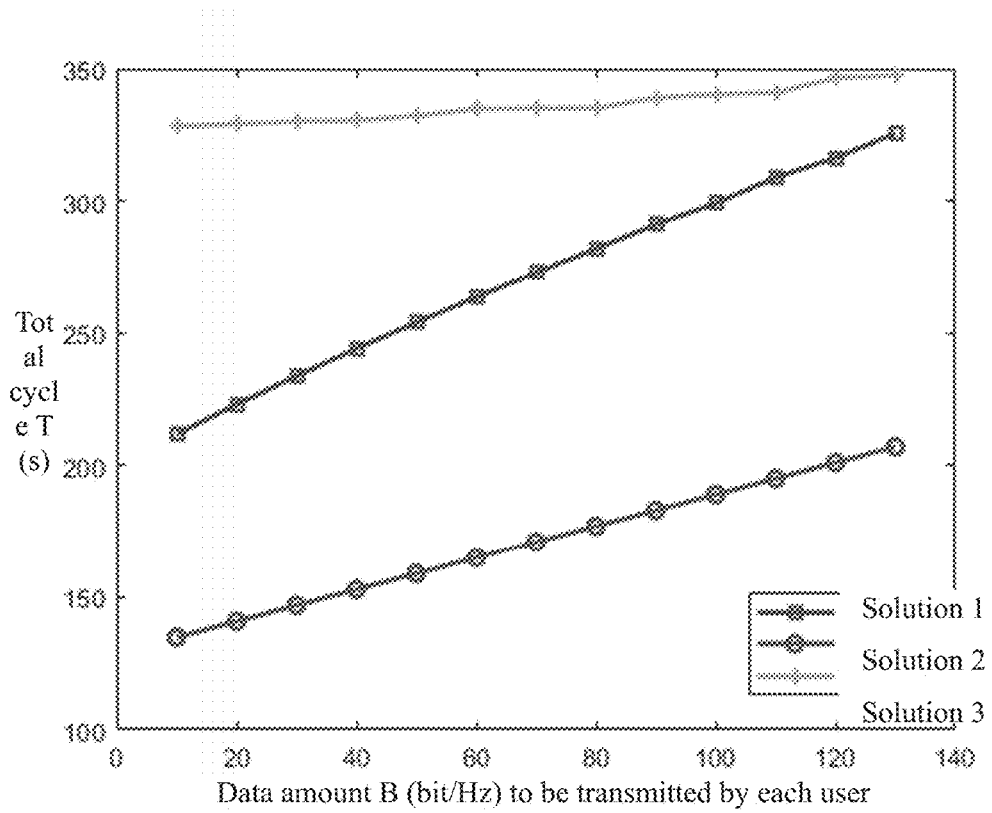
FIG. 4 shows the influence of the amounts B of transmitted data on flight cycles of three different solutions.
Figure 5:
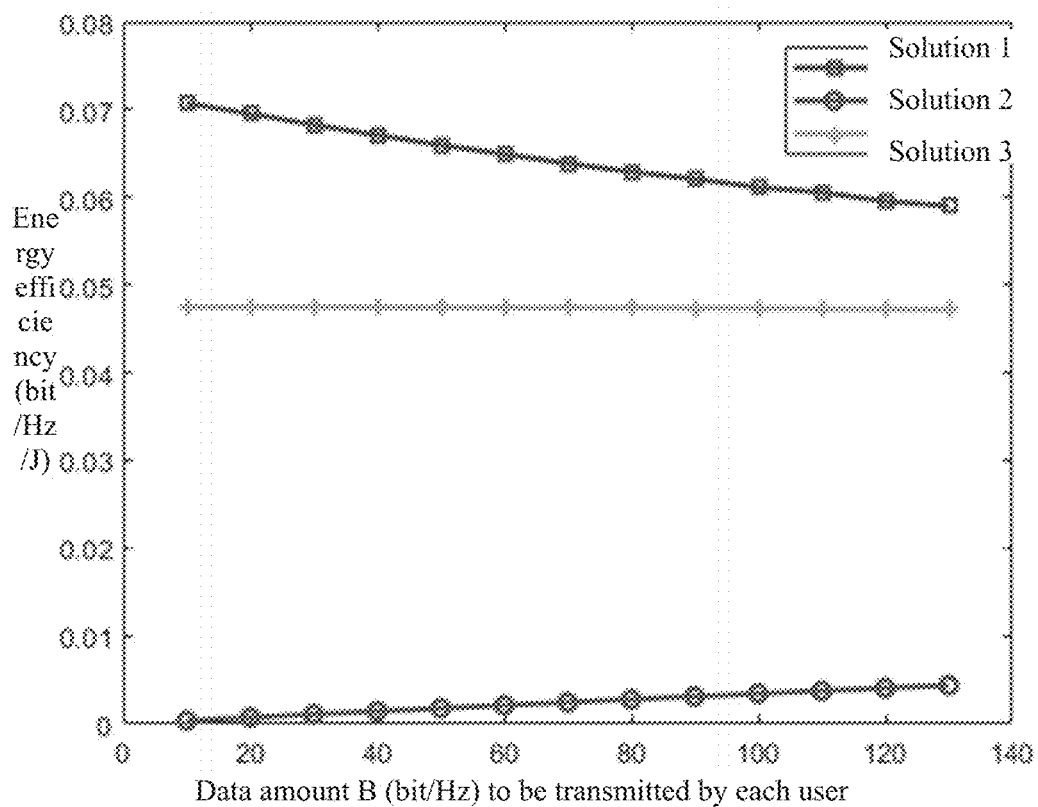
FIG. 5 shows the influence of the amounts B of transmitted data on energy efficiency of three different solutions.

FIG. 4 and FIG. 5 respectively show the curves of flight cycle and energy efficiency changing with B. It can be seen that solution 1 has an obvious advantage in energy efficiency despite of longer flight cycle compared than solution 2. Compared with solution 3, in solution 1, the UAV has higher maneuverability and can fly to an appropriate position to communicate, so the cycle is shorter and the energy efficiency is higher. When B is increased, the flight cycles of the three solutions are increased, and the energy efficiency of solution 1 is decreased. This is because the UAV needs more time to transmit data to satisfy the increasing demand for B. In order to achieve high energy efficiency, a trade-off is needed between the total amount $\bar{R}(\{W\},\{t\},\{S\})$ of transmitted data and energy consumption $E(\{W\},\{t\})$, and when the cycles are increased, $\bar{R}(\{W\},\{t\},\{S\})$ and $E(\{W\},\{t\})$ are increased. When $E(\{W\},\{t\})$ is increased faster, the energy efficiency is decreased.

Figure 6:
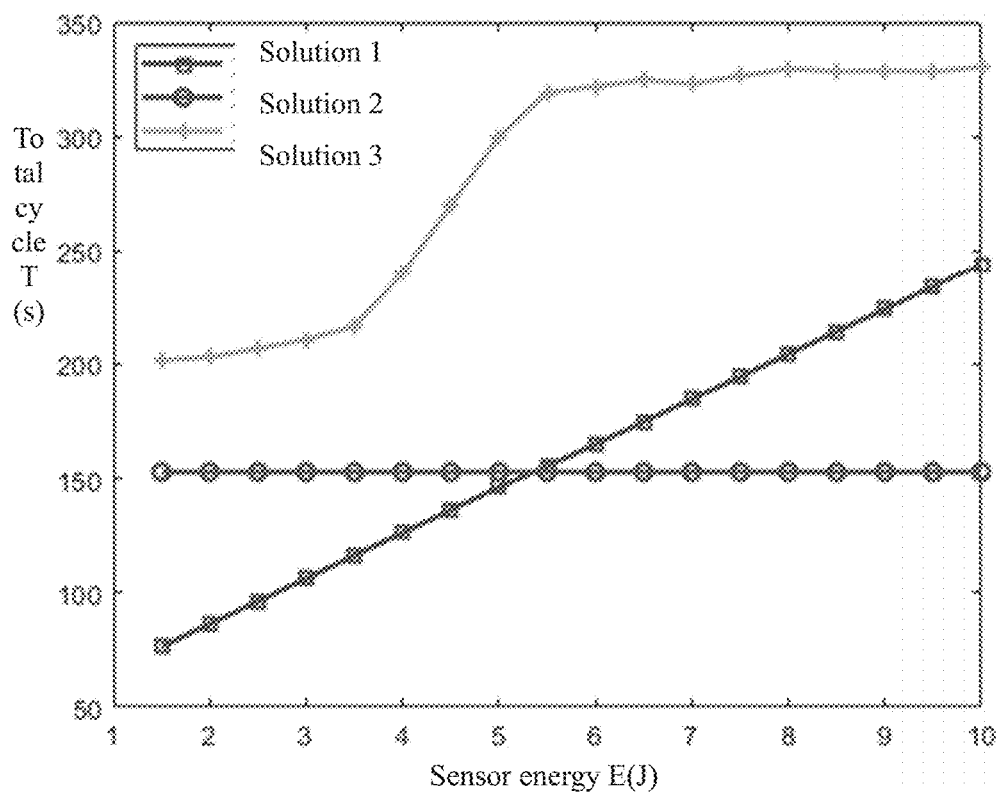
FIG. 6 shows the influence of sensor energy E on flight cycles of three different solutions.
Figure 7:
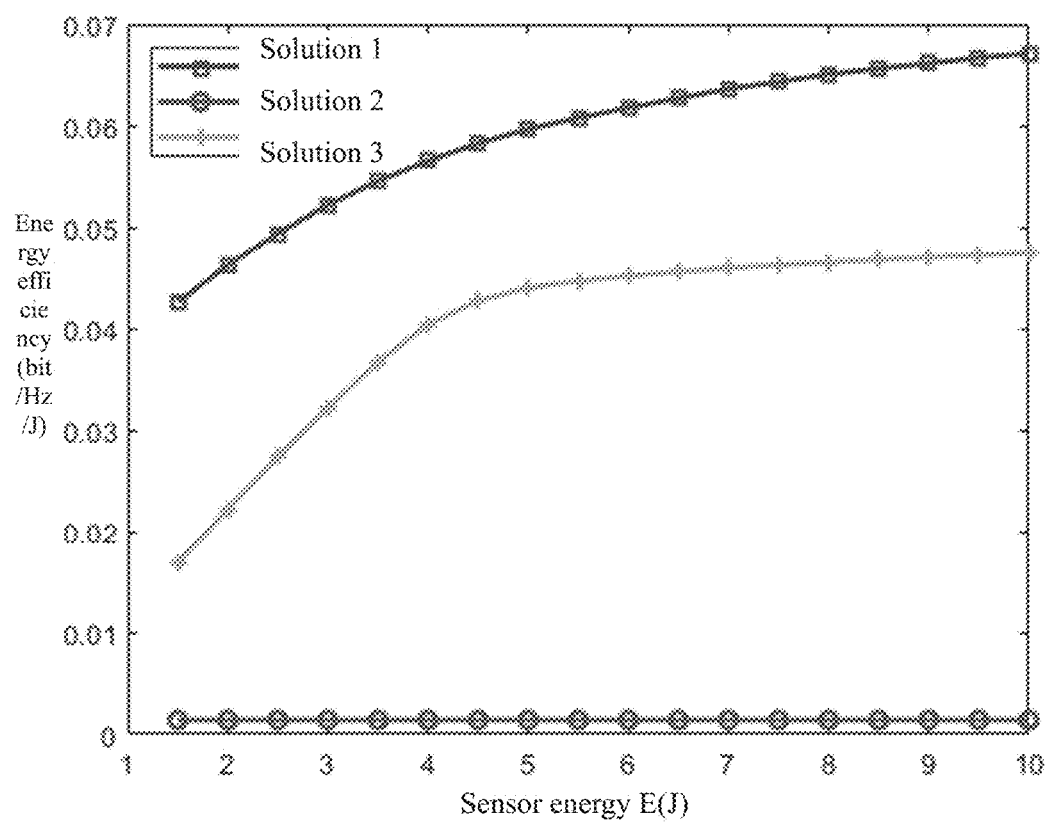
FIG. 7 shows the influence of sensor energy E on energy efficiency of three different solutions.

FIG. 6 and FIG. 7 further compare the curves of the flight cycles and energy efficiency changing with E in the three solutions. When E is increased, the energy efficiency of the three solutions is increased respectively. This is because as E is increased, the sensor has more energy to transmit data, and the trade-off between the total amount $\bar{R}(\{W\},\{t\},\{S\})$ of transmitted data and the energy consumption $E(\{W\},\{t\})$ increases $\bar{R}(\{W\},\{t\},\{S\})$ faster, so the energy efficiency is increased. This further explains that the present invention can effectively realize high energy efficiency green communication of the UAV.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A design method of high energy efficiency unmanned aerial vehicle (UAV) green data acquisition system, comprising the following steps:
   step 1, constructing a system optimization objective:
   (1) serving a set of I ground sensors which are randomly distributed through time division multiple access (TDMA) by an unmanned aerial vehicle (UAV);
   (2) flying, by the UAV, at a fixed altitude H with a maximum flight speed of $V_m$ and a total cycle of T, and discretizing the cycle T into N time slots by a time discretization method, with the length of each time slot of $$t = \frac{T}{N};$$

the coordinate of the UAV is $w[n]=[x(n),y(n)]^T \in R^{2\times 1}$ in time slot n, wherein x(n), y(n) are the x-coordinate and y-coordinate of the UAV respectively, and $R^{2\times 1}$ is a two-dimensional vector space; for a sensor set SI={1, 2, ..., I} of random distribution, the coordinate of sensor i is fixed as $L_i=[x_i,y_i]^T \in R^{2\times 1}$, i∈ SI, each sensor supports the energy of $E_i$, i∈ SI and the data amount to be transmitted is $B_i$, i∈ SI; if communication between the UAV and ground is line of sight (LoS) link communication, channel quality only depends on a distance between the UAV and the sensor, and power gain in unit reference distance is expressed as $\rho_0$, then the channel power gain $h^i[n]$ of the sensor i in the time slot n conforms to a free space path loss model, i.e., $$h^i[n] = \rho_0 d^i[n]^{-2} = \frac{\rho_0}{H^2 + \|w[n] - L_i\|^2}, \forall i \in SI, \quad (5)$$

$d^i[n]$ is the distance between the UAV and the sensor i in the three-dimensional space;

(3) assuming that the UAV serves only one sensor in one time slot, and defining a binary variable $S_i[n] \in \{0,1\}$ to represent wake-up scheduling of the sensor; $S_i[n]=1$ indicates that the UAV establishes communication with the sensor i in the time slot n; $S_i[n]=0$ indicates that the UAV does not establish communication with the sensor i in the time slot n; then, the information transmission rate $R_u^i[n]$ between the UAV and the sensor i in the time slot n is expressed as:

$$R_u^i[n] = S_i[n]\log_2\left(1 + \frac{P_A \rho_0}{(H^2 + \|w[n] - L_i\|^2)\sigma^2}\right), \forall i \in SI \quad (1)$$

wherein $\sigma^2$ is additive white gaussian noise (AWGN) at a receiving end of the UAV, and $P_A$ is the transmission power of a ground sensor during communication; the total information amount $\overline{R}$(bits/Hz) transmitted in one cycle (N time slots) of serving of the UAV is expressed as:

$$\overline{R}(\{W\}, \{t\}, \{S\}) = \sum_{n=1}^{N}\sum_{i=1}^{I} R_u^i[n]t \quad (2)$$

for a rotary-wing UAV, when parameters are constant, the propulsion power P(V) of the UAV is mainly related to flight speed V; the propulsion power is composed of three parts: blade profile power, parasite power and induced power, expressed as:

$$P(V) = \underbrace{P_0\left(1 + \frac{3V^2}{\Omega^2 r^2}\right)}_{\text{blade profile power}} + \underbrace{\frac{1}{2}d_0\rho s A V^3}_{\text{parasite power}} + \underbrace{P_i\left(\sqrt{1 + \frac{V^4}{4v_0^4}} - \frac{V^2}{2v_0^2}\right)^{1/2}}_{\text{induced power}} \quad (3)$$

the speed of the time slot n is approximately expressed as $$v[n] = \frac{\|w[n+1] - w[n]\|}{t} \triangleq \frac{\Delta_n}{t},$$

and $\Delta_n$ is defined as the flight distance of the time slot n; then the propulsion power $P_{prop}[n]$ of the time slot n is approximated expressed by the following formula:

$$P_{prop}[n] = P_0\left(1 + \frac{3\Delta_n^2}{\Omega^2 r^2 t^2}\right) + \frac{1}{2}d_0\rho s A \frac{\Delta_n^3}{t^3} + P_i\left(\sqrt{1 + \frac{\Delta_n^4}{4v_0^4 t^4}} - \frac{\Delta_n^2}{2v_0^2 t}\right) \quad (4)$$

in the formula, $P_0$ and $P_i$ are the blade profile power and the induced power respectively in a hovering state; $\Omega$ is blade angular velocity; r is rotor radius; $d_0$ represents fuselage drag ratio; $\rho$ is air density; s is rotor solidity; A is rotor disc area; $v_0$ is mean rotor induced velocity; the above parameters are constants; the total propulsion energy E consumed by the UAV in one cycle of serving is expressed as:

$$E(\{W\}, \{t\}) = \sum_{n=1}^{N} P_{prop}[n]t \quad (5)$$

according to the definition of energy efficiency, the system optimization objective is represented as:

$$EE(\{W\}, \{t\}, \{S\}) = \frac{\overline{R}(\{W\}, \{t\}, \{S\})}{E(\{W\}, \{t\})} = \frac{\sum_{n=1}^{N}\sum_{i=1}^{I} R_u^i n[t]}{\sum_{n=1}^{N} P_{prop} n[t]} \quad (6)$$

step 2, constructing an optimization problem according to the energy efficiency formula in step 1, wherein an optimization objective is maximization of EE({W},{t}, {S}), and constraints comprise UAV trajectory constraints, sensor wake-up scheduling constraints, sensor energy constraint and data amount constraint to construct the following optimization problem:

$$\max_{S,W,t} EE(\{W\}, \{t\}, \{S\}) \quad (7a)$$

$$\text{s.t. } w[1] = w[N] \quad (7b)$$

$$\|w[n+1] - w[n]\|^2 \leq \gamma H^2, n = 1, \ldots N-1 \quad (7c)$$

$$\|w[n+1] - w[n]\| \leq V_m t, n = 1, \ldots N-1 \quad (7d)$$

$$\sum_{i=1}^{I} S_i[n] = 1 \quad (7e)$$

$$S_i[n] \in \{0, 1\}, \forall i \in SI, \forall n \quad (7f)$$

$$\sum_{n=1}^{N} (R_u^i[n]t) \geq B_i, \forall i \in SI \quad (7g)$$

$$\sum_{n=1}^{N} (S_i[n]P_A t) \geq E_i, \forall i \in SI \quad (7h)$$

in the above optimization problem, formulas (7b)-7(d) are trajectory constraints, $V_m$ is the maximum speed of the UAV and the UAV returns to an initial position after flying by a cycle; formulas (7e) and (7f) are the sensor wake-up scheduling constraints; formula (7g) is the data amount constraint of the sensor and $B_i$ is the data amount to be transmitted by the sensor i; formula (7h) is the sensor energy constraint and $E_i$ is maximum energy supported by the sensor i in each cycle;

step 3, decomposing an original problem (7) into two sub-problems according to a block coordinate descent method; for the two sub-problems, approximately converting two non-convex problems into two convex optimization problems and calculating the problems by a successive convex approximation technique, as follows:

(1) optimization sub-problem of wake-up scheduling S and time slot t fixing UAV trajectory W so that the sub-problem is the non-convex optimization problem of wake-up scheduling S and time slot t; firstly, for a binary variable S, slacking S to a continuous variable within a range [0,1]; then, introducing an auxiliary variable z[n] to satisfy $$z[n]^2 = \sqrt{t^4 + \frac{\Delta_n^4}{4v_0^4} - \frac{\Delta_n^2}{2v_0^2}}, \forall n, \text{ i.e., } t^4 = z[n]^4 + \frac{\Delta_n^2}{v_0^2}z[n]^2, \forall n;$$

using z[n] to replace the third term of the propulsion power $P_{prop}[n]$ in formula (4) to obtain the UAV propulsion power $P_{prop}^A[n]$ under the sub-problem; introducing an auxiliary variable R_t[i] to satisfy $$R\_t[i]^2 = \sum_{n=1}^{N} R_u^i[n]t, \forall i;$$

after introducing the auxiliary variables, applying the successive convex approximation technique for non-convex constraints, converting hyperbolic constraints into SOCP and approximating the original non-convex sub-problem as a convex problem, expressed as:

$$\max_{\substack{S,W,t \\ z[n], \\ R\_t[i]}} \frac{\sum_{i=1}^{I} R\_t_{lb}[i]}{\sum_{n=1}^{N} P_{prop}^A[n]t} \quad (8a)$$

$$\text{s.t. } \|w[n+1] - w[n]\| \le V_m t, n = 1, \ldots N-1 \quad (8b)$$

$$\sum_{i=1}^{I} S_i[n] \le 1, \forall n \quad (8c)$$

$$0 \le S_i[n] \le 1, \forall i, \forall n \quad (8d)$$

$$R\_t_{lb}[i] \ge B_i, \forall i \quad (8e)$$

$$\sum_{n=1}^{N}(S_i[n]P_A) \le E_i\left(\frac{1}{t}\right)_{lb}, \forall i \quad (8f)$$

$$t^4 \le z^{(r)}[n]^4 + 4z^{(r)}[n]^3(z[n] - z^{(r)}[n]) + \quad (8g)$$
$$\frac{\Delta_n^2}{v_0^2}(z^{(r)}[n]^2 + 2z^{(r)}[n](z[n] - z^{(r)}[n])), \forall n$$

$$\left\|\left[2R\_t[i], \sum_{n=1}^{N} R_u^i[n] - t\right]^\dagger\right\| \le \sum_{n=1}^{N} R_u^i[n] + t, \forall i \quad (8h)$$

in the sub-problem (8), $P_{prop}^A[n]$ is the propulsion power after the auxiliary variable z[n] is introduced, and is a convex function of t and z[n]; $R\_t_{lb}[i]$ is the lower bound of first-order taylor expansion of the auxiliary variable $R\_t[i]^2$, and is a linear function of $$R\_t[i]; \left(\frac{1}{t}\right)_{lb}$$

is the lower bound of first-order taylor expansion of $$\frac{1}{t},$$

and has a linear relationship with t; the constraints of the sub-problem (8) are convex constraints; the optimization objective (8a) is a standard concave-convex fractional programming problem with concave numerator over convex denominator; because the constraint range is reduced by the successive convex approximation technique, the optimal solution of the convex problem after approximation is the lower bound of the optimal solution of an original sub-problem;

(2) optimization sub-problem of UAV trajectory W fixing wake-up scheduling S and time slot t so that the sub-problem is a non-convex optimization problem of the UAV trajectory W; introducing an auxiliary variable y[n] to satisfy $$y[n]^2 = \sqrt{t^4 + \frac{\Delta_n^4}{4v_0^4} - \frac{\Delta_n^2}{2v_0^2}}, \forall n, \text{ i.e., } \frac{t^4}{y[n]^2} = y[n]^2 + \frac{\Delta_n^2}{v_0^2}, \forall n;$$

using y[n] to replace the third term of the propulsion power $P_{prop}[n]$ in formula (4) to obtain the UAV propulsion power $P_{prop}^B[n]$ under the sub-problem; after introducing the auxiliary variables, applying the successive convex approximation technique for non-convex constraints, and approximating the original non-convex sub-problem as a convex problem, expressed as:

$$\max_{W, y[n]} \frac{\sum_{n=1}^{N}\sum_{i=1}^{I} R_u^{i,lb}[n]t}{\sum_{n=1}^{N} P_{prop}^B[n]t} \quad (9a)$$

$$\text{s.t. } w[1] = w[N] \quad (9b)$$

$$\|w[n+1] - w[n]\|^2 \le \gamma H^2, n = 1, \ldots N-1 \quad (9c)$$

$$\|w[n+1] - w[n]\| \le V_m t, n = 1, \ldots N-1 \quad (9d)$$

$$\sum_{n=1}^{N}(R_u^{i,lb}[n]t) \ge B_i, \forall i \quad (9e)$$

$$\frac{t^4}{y[n]^2} \le (y^{(r)}[n]^2) + 2y^{(r)}[n](y[n] - y^{(r)}[n]) - \frac{\|w^{(r)}[n+1] - w^{(r)}[n]\|^2}{v_0^2} + \quad (9f)$$

$$\frac{2}{v_0^2}(w^{(r)}[n+1] - w^{(r)}[n]) \cdot (w[n+1] - w[n]) \quad (9g)$$

in the sub-problem (9), $P_{prop}^B[n]$ is the propulsion power after the auxiliary variable y[n] is introduced, and is a convex function of w[n]; $R_u^{i,lb}[n]$ is the lower bound of first-order taylor expansion of the information transmission rate $R_u^i[n]$ on $\|w[n]-L_i\|$, and is a concave function of w[n]; the solving method of the sub-problem (9) is the same as that of the sub-problem (8); the optimal solution of the convex problem after approximation is the lower bound of the optimal solution of the original sub-problem;

(3) overall iterative algorithm design in each iteration, by solving the sub-problem (8) and the sub-problem (9), alternately optimizing wake-up scheduling S, the time slot t and the UAV trajectory W;

using the solution obtained in each iteration as the input of next iteration; the termination condition for iteration is that the increase of optimization values of one iteration and the previous iteration is less than a set threshold; the details are as follows:

3.1) setting an iteration termination threshold $\varepsilon$, an initial trajectory $w^0$ and an iteration index $r=0$;

3.2) in the r+1 iteration, using the trajectory $w^r$ obtained from the r iteration to solve the sub-problem (8) to obtain the optimization result of the sub-problem (8) of the r+1 iteration, namely, wake-up scheduling $S^{r+1}$ and time slot $t^{r+1}$;

3.3) solving the sub-problem (9) by the given $w^r$, $S^{r+1}$ and $t^{r+1}$, to obtain the optimization result of the sub-problem (9) of the r+1 iteration, namely trajectory $w^{r+1}$;

3.4) if the increase of an optimization target value is greater than a threshold $\varepsilon$, then updating the iteration index $r=r+1$; skipping back to step 4.2) for the next iteration; and if the increase of the target value is less than the threshold $\varepsilon$, terminating the iteration.

* * * * *